E. W. MORLEY.
FRAME OF BICYCLES.
APPLICATION FILED OCT. 31, 1914.
1,148,707.
Patented Aug. 3, 1915.
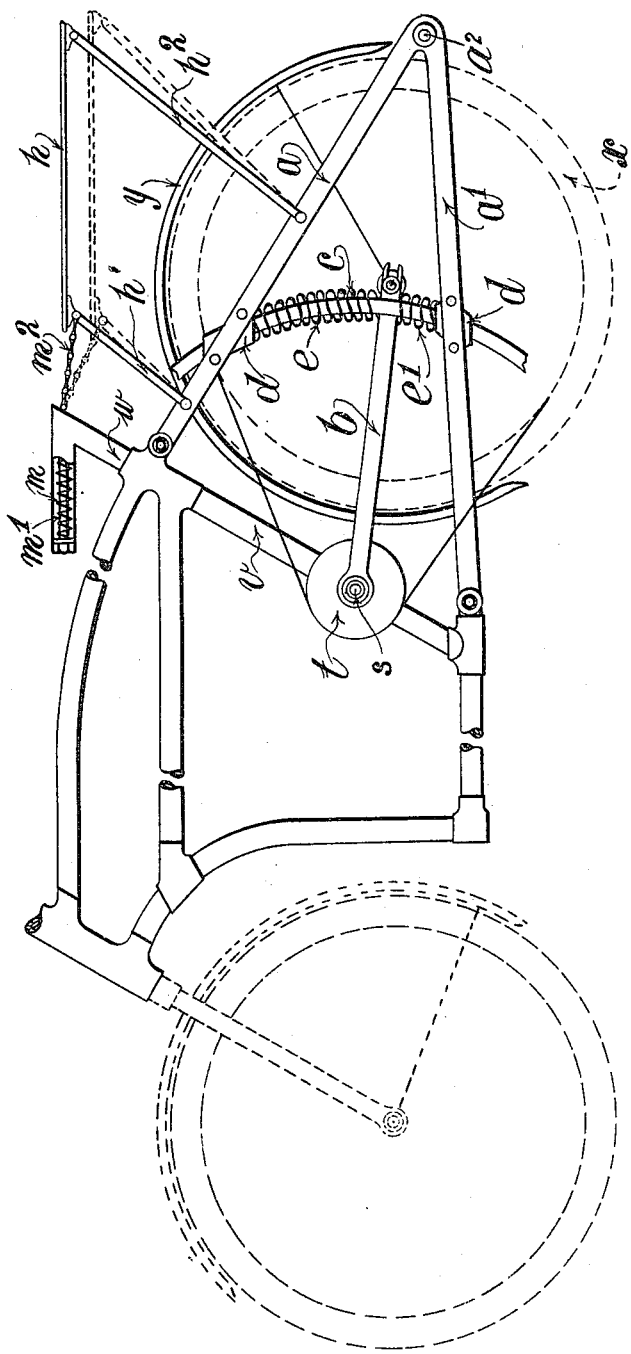
WITNESSES
Charles E. Vagg
L Savon
INVENTOR
E. W. Morley.
per Robert E. Phillips
Attorney.

UNITED STATES PATENT OFFICE.

EDMUND WILLIAM MORLEY, OF SOUTHSEA, ENGLAND.

FRAME OF BICYCLES.

1,148,707. Specification of Letters Patent. Patented Aug. 3, 1915.

Application filed October 31, 1914. Serial No. 869,617.

*To all whom it may concern:*

Be it known that I, EDMUND WILLIAM MORLEY, a subject of the King of Great Britain and Ireland, residing at 29 Salisbury road, Southsea, in the county of Hants, England, have invented a new and useful Improvement in the Frames of Bicycles, of which the following is a full and complete specification.

This invention relates to the frames of bicycles of the so-called "safety" type in which both the wheels are of approximately the same size and in which the rear wheel is the driving wheel, and it consists of an improved construction of that type of frame in which the rear driving wheel is elastically mounted in relation to the main part of the frame carrying the steering wheel and the seat for the rider.

According to the present invention the driving wheel is carried in a fork or frame which is pivoted at its forward end to the main frame and is constrained to move within a rearward extension of the said frame against the action of one or more springs operating to take and support the load, and on said rearward extension of the main frame is mounted a spring-controlled platform, for carrying luggage or a seat for a second rider. By this construction the entire load carried by the bicycle is elastically supported.

In the accompanying drawing which illustrates this invention the figure is a view in side elevation of a frame for a motor-driven bicycle embodying this invention, such parts only being shown as are pertinent to the present invention.

The main frame of the machine is of the well-known tubular construction and so far as relates to the central member $v$ carrying the seat pillar $w$ and to all in front of said member it presents no novel features. To the rear however of the central member $v$ the main frame consists of an upper fork $a$ and a lower fork $a^1$ which extend rearward and meet at a convenient point to the rear of the driving road wheel $x$ (shown in dotted lines), at which point the side members of each fork—which are preferably made in one piece—are rigidly coupled together by a cross or transverse member $a^2$.

On the central member $v$ of the main frame at a suitable height is mounted a bearing for the shaft $s$ carrying the transmission wheel or sprocket $t$. At or about the center of this shaft is pivoted a fork $b$ adapted to carry the driving road wheel $x$. Each of the members of said fork carries a guide bar or sector $c$ which is adapted to slide in suitable guides $d$ carried by the members of the forks $a$ and $a^1$, and on said bars or sectors between the members of the fork $b$ and those of the fork $a$ springs $e$ are mounted which are adapted to take or support the load, and on said bars or sectors between the members of the fork $b$ and those of the fork $a^1$ are mounted springs $e^1$ which are adapted to damp or check the reaction of the springs $e$. To stiffen the fork $b$ the bars or sectors $c$ are preferably coupled together above the periphery of the driving wheel, which said extension can conveniently form a support for the mud guard $y$.

It will be appreciated that this construction of spring frame is particularly adapted to motor bicycles intended to be used with side cars, as it provides a rigid attachment for said cars to the rear of the axis of the driving wheel of the bicycle without subjecting said cars to the movement of said wheel, and it also tends to relieve the side strain thrown on the front steering wheel.

What I claim as my invention and desire to secure by Letters Patent is:—

1. A frame for rear driving safety bicycles, comprising a central member adapted to carry the seat pillar and a bearing for the transmission wheel or sprocket, members extending forward from said central member to carry the head or pivot for the frame carrying the front steering wheel, rigid members extending rearward from the central member to a point beyond the periphery of the driving wheel, a member rigidly coupling the ends of said rearwardly extending members together beyond the periphery of the driving wheel, a fork for carrying the rear driving wheel pivoted to the central member and lying within the rearwardly extending members of the main frame, means for guiding said fork in relation to the rearwardly extending members of the main frame, and springs operating between the pivoted fork and said rear part of main frame.

2. In a frame for rear driving safety bicycles, the combination with the central member adapted to carry the seat pillar and a bearing for the transmission wheel or sprocket, of members extending forward from said central member to carry the head or pivot for the frame carrying the front steering wheel, members extending rearward from the central member to a point beyond the periphery of the driving wheel, a member coupling the ends of said rearwardly extending members beyond the periphery of the driving wheel, a fork for carrying the rear driving wheel pivoted to the central member and lying within the rearwardly extending members of the main frame, sectors carried by said fork, guides for said sectors mounted on the forked members of the rearward extension of the main frame, springs encircling said sectors above the members of the pivoted fork and adapted to support the load on the machine, and springs encircling said sectors below the members of the pivoted fork and adapted to damp or check the reaction of the springs above said fork, as set forth.

In testimony whereof I have signed my name in the presence of two subscribing witnesses.

EDMUND WILLIAM MORLEY.

Witnesses:
HARVEY J. BAVERSTOET,
CHARLES PACK.

Copies of this patent may be obtained for five cents each, by addressing the "Commissioner of Patents, Washington, D. C."